United States Patent
Kim

[11] Patent Number: 5,429,417
[45] Date of Patent: Jul. 4, 1995

[54] KNOCKDOWN CHAIR FOR CHILDREN

[75] Inventor: Jee-Yong Kim, Seoul, Rep. of Korea

[73] Assignee: Dong In, Inc., Rep. of Korea

[21] Appl. No.: 145,395

[22] Filed: Oct. 29, 1993

[30] Foreign Application Priority Data

Feb. 5, 1993 [KR] Rep. of Korea .............. 93-1459

[51] Int. Cl.$^6$ .......................... A47C 4/02; A47C 5/10
[52] U.S. Cl. ........................ 297/440.1; 297/440.21; 297/440.22; 297/440.24; 403/169; 403/188; 403/197; 403/225; 403/288
[58] Field of Search .......... 297/440.1, 440.14, 440.16, 297/440.22, 440.24; 108/19, 156, 157, 180, 193; 403/169, 170, 188, 189, 195, 197, 203, 217, 225, 231, 288, 291

[56] References Cited

U.S. PATENT DOCUMENTS

| | | | |
|---|---|---|---|
| 2,468,985 | 5/1949 | Krotz | 403/225 |
| 2,965,426 | 12/1960 | Wiederhold | 403/225 |
| 3,074,203 | 1/1963 | Paksy | 297/440.24 X |
| 3,645,569 | 2/1972 | Reilly | 403/406.1 |
| 3,695,072 | 10/1972 | Ingellis | 297/440.24 |
| 3,835,354 | 9/1974 | Torres-Pena | 403/231 X |
| 3,986,316 | 10/1976 | Blodee | 403/231 X |
| 4,125,338 | 11/1978 | Lew | 403/169 |
| 4,273,462 | 6/1981 | Fukuchi | 403/231 X |
| 4,630,550 | 12/1986 | Weitzman | 108/180 X |

FOREIGN PATENT DOCUMENTS

| | | | |
|---|---|---|---|
| 2356033 | 1/1978 | France | 403/231 |
| 2667656 | 4/1992 | France | 403/170 |
| 63-10769 | 3/1988 | Japan | |

*Primary Examiner*—Peter R. Brown
*Attorney, Agent, or Firm*—Majestic, Parsons, Siebert & Hsue

[57] ABSTRACT

A knockdown chair for children easily assembled and disassembled, and maintaining a desired connection strength for a long time. The knockdown chair comprises a square seat plate having an insert projection on its side surface, a plurality of support beams engaging with and surrounding the seat plate by reception of individual insert projections of the seat plate and each having a reception slit at its side surface and a pair of reception holes on its opposed ends, a plurality of connection members connecting the support beams to each other at corners of the seat plate and each having three inserts in order to be coupled not only to corresponding neighbor support beams but also to a leg member, and the leg member coupled to the connection member for supporting the seat plate and the support beams. The reception slit and the reception holes of the parts of the chair are preferably provided with elastic soft layers made of a soft synthetic resin material for facilitating assembly and disassembly of the chair.

8 Claims, 6 Drawing Sheets

KNOCKDOWN CHAIR FOR CHILDREN

BACKGROUND OF THE INVENTION

1. Field of the Invention

The present invention relates in general to furniture for children, and more particularly to a knockdown chair for children comprising a plurality of prefabricated parts assembled into the chair.

2. Description of the Prior Art

There have been proposed several types of knockdown furniture for children such as a knockdown juvenile chair disclosed in Japanese Utility Model Publication No. Sho. 63-10769. Referring to FIG. 6 showing the knockdown chair disclosed in the above Japanese Utility Model, the knockdown chair comprises two pairs of leg members 102a and 102b, each of which is made of a treatable material such as wood or a synthetic resin material. In this knockdown chair, each of the longer leg members 102a and a corresponding shorter leg member 102b are connected to each other by two support beams and constitute a side support unit 102. In order to finish preparation of the knockdown chair, a back support beam 107 and a seat member 110 are placed between the two side support units 102 and, thereafter, fixed to the leg parts 102 by set screws 130.

However in the above knockdown chair, the leg members 102a and 102b should be tightly fixed to the support beams 103 using fixing means such as set screws in order to prepare the two side support units 102, and both the back support beam 107 and the seat member 110 should be, thereafter, tightly fixed to the side support units 102 between them by the set screws 130. Thus, the above knockdown chair has a problem that it is attended with considerable difficulty in its assembly and inevitably requires a tool such as a screwdriver in its assembly and disassembly.

In addition, it is impossible to reassemble the disassembled parts into the knockdown chair when the set screws disappear. Furthermore, when the side leg parts 102 are repeatedly screwed to and separated from both the back support beam 107 and the seat member 110, the screw holes of the side leg parts 102, of the back support beam 107 and of the seat member 110 are enlarged such that a desired connection strength of the assembled knockdown chair is not achieved, thus to generate creak during use of the chair and to cause a desired performance of the chair not to be achieved.

SUMMARY OF THE INVENTION

It is, therefore, an object of the present invention to provide a knockdown chair for children in which the aforementioned problems caused by the known knockdown chair can be overcome and which is easily assembled and disassembled, and maintains a desired connection strength for a long time even when it is reassembled several times.

In accordance with an embodiment of the present invention, the knockdown chair for children comprises a polygonal seat plate having an insert projection on every side surface thereof; a plurality of support beams detachably engaging with and surrounding the seat plate by reception of individual insert projections of the seat plate, each of the support beams having a reception slit and a pair of reception holes, the reception slit being provided at a side surface of the beam and the pair of reception holes being provided on opposed ends of the beam, respectively; a plurality of connection members detachably connecting the support beams to each other at corners of the seat plate, each of the connection members having three inserts in order to be detachably coupled not only to corresponding neighbor support beams but also to a leg member; and the leg member detachably coupled to the connection member for supporting the seat plate and the support beams.

In another embodiment of the present invention, the knockdown chair for children comprises a polygonal seat plate having an insert protection on every side surface thereof; a plurality of support beams detachably engaging with and surrounding the seat plate by reception of individual insert projections of the seat plate, each of the support beams having a reception slit and a pair of reception holes, the reception slit being provided at a side surface of the beam and the pair of reception holes being provided on opposed ends of the beam, respectively; a first connection member detachably connecting corresponding neighbor support beams to each other at a front corner of the seat plate, the first connection member having three inserts in order to be detachably coupled to the support beams as well as to a front leg member; the front leg member detachably coupled at its upper end to the first connection member in order to support the seat plate and the support beams, the front leg member having a reception hole at its upper end; a second connection member detachably connecting corresponding neighbor support beams to each other at a rear corner of the seat plate, the second connection member having four inserts in order to be detachably coupled to the support beams, to a corresponding back support column of a back support frame and to a rear leg member; the rear leg member detachably coupled at its upper end to the second connection member in order to support, in cooperation with the front leg member, the seat plate and the support beams, the rear leg member having a reception hole at its upper end; a third connection member detachably connecting a corresponding back support column to a back beam, the third connection member having two inserts in order to be coupled to both the back support column and the back beam; and the back support column and the back beam detachably coupled to each other by the third connection member in order to form the back support frame, each of the back support column and the back beam having a pair of reception holes at its opposed ends.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
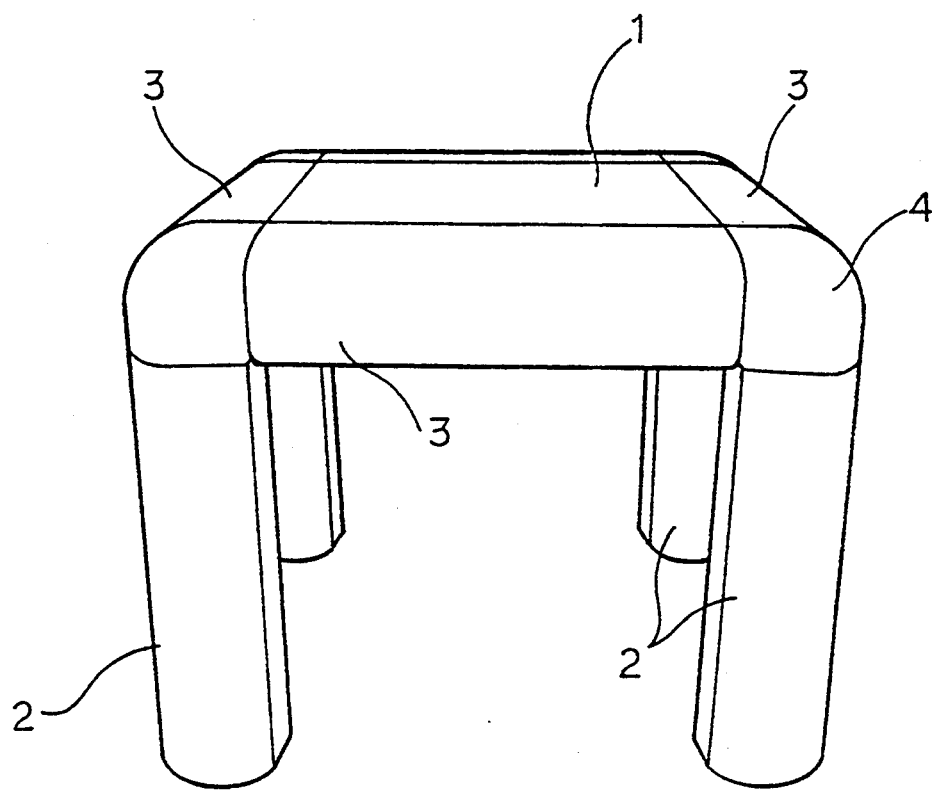
FIG. 1 is a perspective view of a knockdown chair for children in accordance with a primary embodiment of the present invention.
Figure 2:
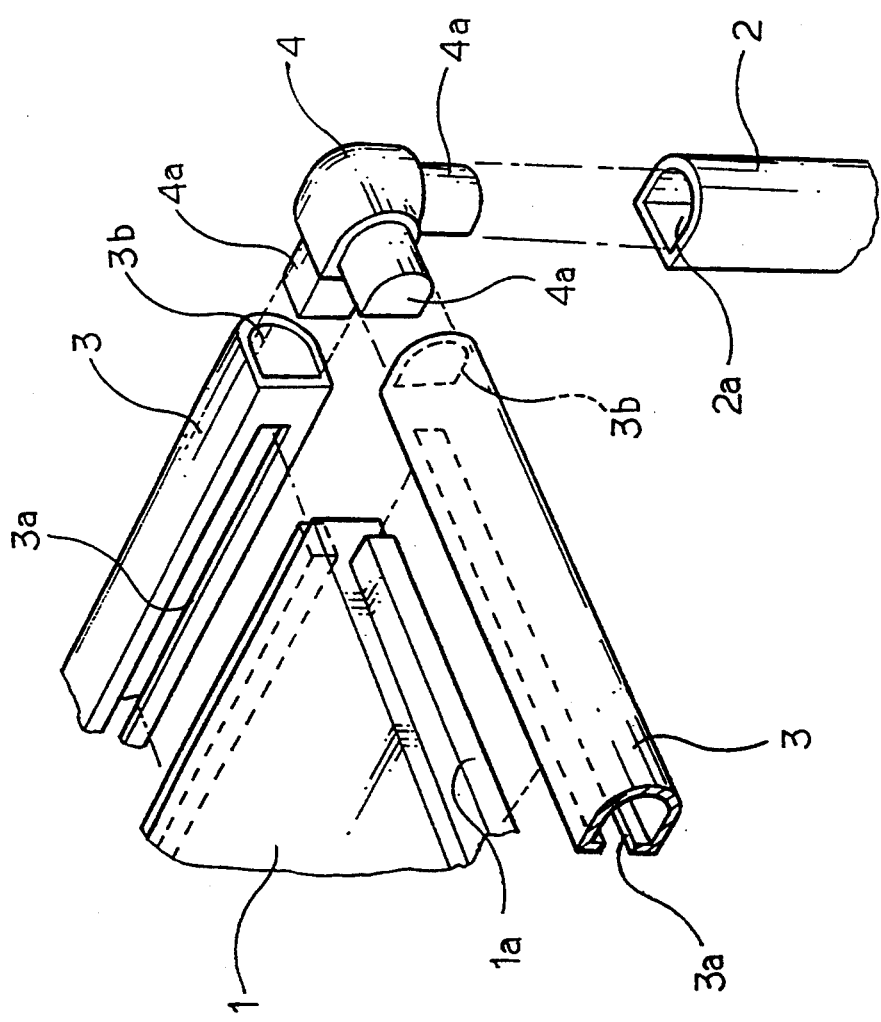
FIG. 2 is a partially enlarged exploded perspective view of the knockdown chair of FIG. 1, showing a connection structure of a seat plate, two support beams and a leg member using a connection member.

With reference to FIGS. 1 and 2, there are shown a knockdown chair for children in accordance with a primary embodiment of the present invention and a connection structure of support beams and leg members using a connection member of the knockdown chair, respectively. This knockdown chair according to the primary embodiment is a stool type chair and comprises a square seat plate 1 having a longitudinal insert projection la on each side thereof. The seat plate 1 engages with and is surrounded by four hollow support beams 3 each of which has an axial reception slit 3a for reception of a corresponding insert projection 1a of the seat plate 1. Each of the support beams 3 is opened at its both ends in order to provide reception holes 3b at the ends. The chair of the stool type also comprises a connection member 4 which is placed on every corner of the square seat plate 1 and coupled to two corresponding support beams 3 in order to connect the two support beams 3, engaging with the seat plate 1, to each other and to maintain the engagement of the support beams 3 with the seat plate 1. A leg member 2 is coupled to the connection member 4 in order to support both the seat plate 1 and the support beams 3 engaging with each other.

The longitudinal insert projections 1a of the seat plate 1 integrally extend from the side surfaces of the seat plate 1, respectively, and inserted into individual reception slits 3a of the support beams 3 in order to achieve the engagement of the seat plate 1 with the support beams 3. The connection member 4 has three inserts 4a which are integrally formed with the member 4 and perpendicular to each other. Of the three inserts 4a of this connection member 4, two inserts 4a are inserted into individual reception holes 3b of support beams 3 while the other part 4a is inserted into a reception hole 2a provided on the upper end of a corresponding leg member 2.

In the primary embodiment, the connection member 4 is made of a hard synthetic resin and preferably produced by extrusion. This connection member 4 has the three inserts 4a which are inserted into individual reception holes 3b and 2a of the support beams 3 and of the leg member 2, thus to achieve the connection of the support beams 3 to the leg member 2 in such a manner that the two support beams 3 and the leg member 2 are perpendicular to each other.

In order to assemble the seat plate 1, the support beams 3, the connection members 4 and the leg members 2 into the desired knockdown chair of the stool type according to the primary embodiment, the two inserts 4a of each connection member 4 are tightly inserted in individual reception holes 3b of two corresponding support beams 3 at the same time of tight insertion of the linear insert projections 1a of the seat plate 1 into individual reception slits 3a of the support beams 3. The other insert 4a of the connection member 4 is, thereafter, inserted into the reception hole 2a of a corresponding leg member 2, thereby finishing the assembly of the knockdown chair of the stool type.

As described above, assembly of the knockdown chair of the stool type according to the primary embodiment of this invention is easily achieved by insertion of the linear insert projections 1a of the seat plate 1 into the reception slits 3a of the support beams 3, by insertion of the two inserts 4a of each connection member 4 into the reception holes 3b of two corresponding support beams 3 and by insertion of the other insert 4a of the connection member 4 into the reception hole 2a of a corresponding leg member 2. Therefore, the assembly of the knockdown chair is facilitated and the desired strength of the assembled chair are continued for a long time. Of course, disassembly of the chair of this primary embodiment is easily achieved by separation of the leg members 2 from individual connection members 4, separation of the connection members 4 from the support beams 3 and separation of the seat plate 1 from the support beams 3.

Figure 3:
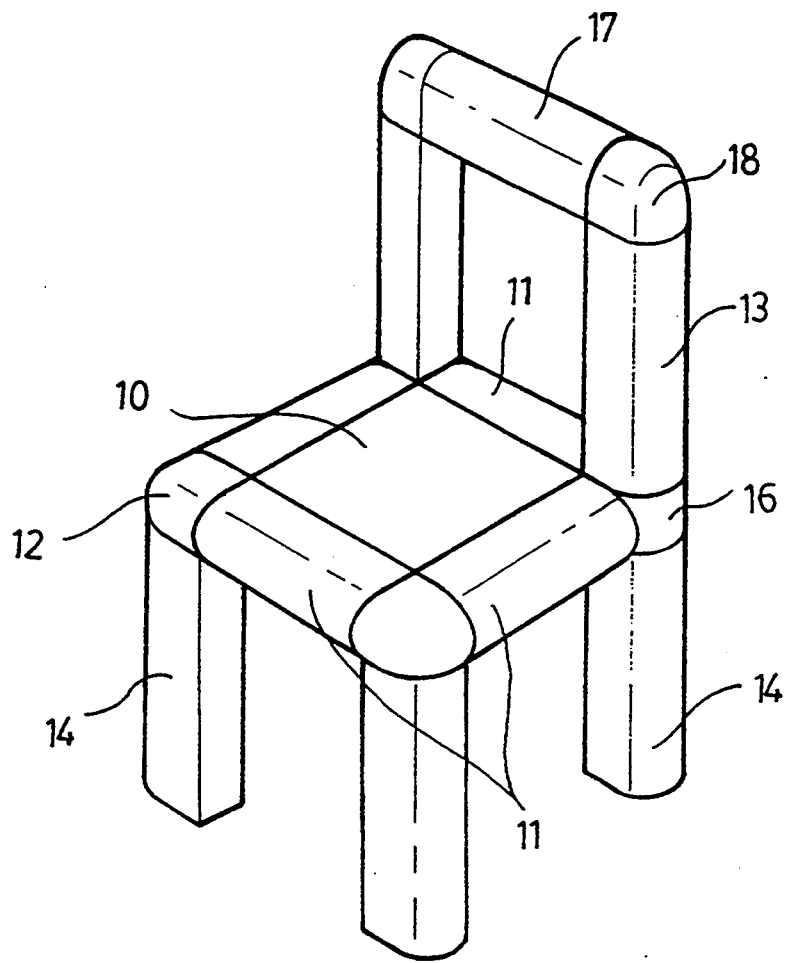
FIG. 3 is a perspective view of a knockdown chair for children in accordance with a second alternate embodiment of the present invention.
Figure 4:
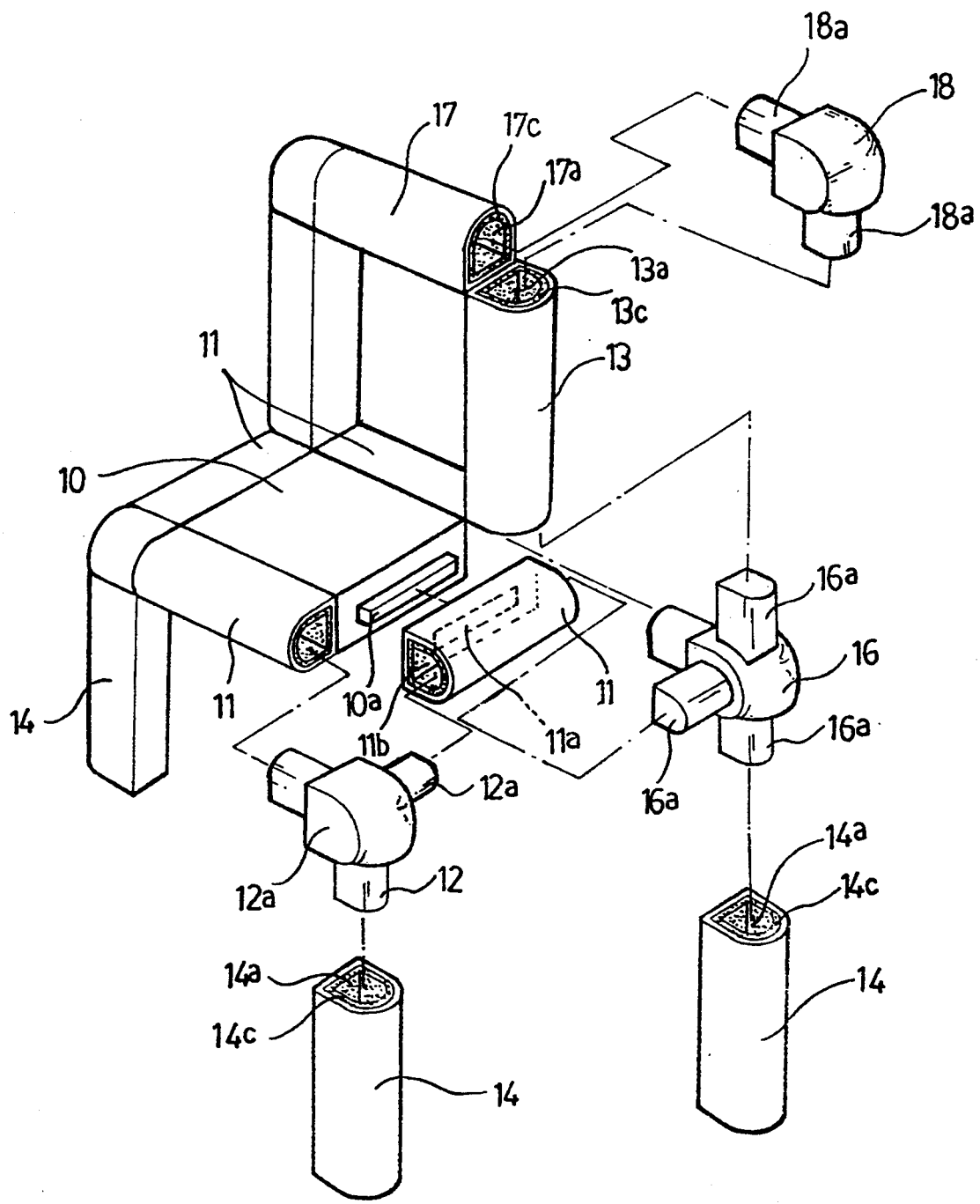
FIG. 4 is a partially enlarged exploded perspective view of the knockdown chair of FIG. 3, showing a connection structure of a seat plate, support beams, leg members, a back support column and back support beam using three types of connection members.

Turning to FIGS. 3 and 4, there are shown a knockdown chair for children in accordance with a second alternate embodiment of the present invention and a connection structure of support beams, back support frame and leg members using three types of connection members of the knockdown chair, respectively. The knockdown chair according to the second alternate embodiment comprises a square seat plate 10 having four longitudinal insert projections 10a on the sides thereof. The seat plate 10 engages with and is surrounded by four support beams 11 each of which has an axial reception slit 11a for reception of a corresponding insert projection 10a of the seat plate 10. Each of the support beams 11 is opened at its both ends in order to provide reception holes 11b at those ends. The knockdown chair of this second alternate embodiment also comprises a first connection member 12 which is placed on each front corner of the square seat plate 10 and coupled to two corresponding support beams 11 in order to connect the two support beams 11, engaging with the seat plate 10, to each other. This first connection member 12 has three inserts 12a which are integrally formed with the member 12 and perpendicular to each other and of which two inserts 12a are inserted into individual reception holes 11b of the support beams 11 but the other part 12a is inserted into a reception hole 14a provided on an upper end of a front leg member 14.

This knockdown chair further comprises a second connection member 16 which is placed on each rear corner of the square seat plate 10 and coupled to two corresponding support beams 11 in order to connect the two support beams 11, engaging with the seat plate 10, to each other. This second connection member 16 is also coupled to a rear leg member 14 and to a back support column 13 of the back support frame. In order to be coupled to all of the two support beams 11, the rear leg member 14 and the back support column 13, the second connection member 16 has four inserts 16a which are integrally formed with the member 16. Of the four inserts 16a of the second connection member 16, two inserts 16a extending from the middle section of the member 16 to be perpendicular to each other are inserted into individual reception holes 11b of the support beams 11. The other two inserts 16a, which extend from upper and lower ends of the member 16 respectively, are inserted into a reception hole 14a, provided on an upper end of the rear leg member 14, and into a reception hole 13a provided on a lower end of the back support column 13, respectively. A back support beam 17 of the back support frame is coupled at its opposed ends to the back support columns 13 by a pair of third connection members 18 each of which has two inserts 18a integrally formed with the member 18 and perpendicular to each other. The two inserts 18a of each third connection member 18 are inserted into an upper reception holes 13a of a corresponding back support column 13 and a reception hole 17a of the back support beam 17, respectively.

In the second alternate embodiment, the first connection member 12, which is integrally formed with three inserts 12a perpendicular to each other and coupled to the support beams 11 and to the front leg member 14, is preferably made of a hard synthetic resin and produced by extrusion. In the same manner, both the second connection member 16 and the third connection member 18 are made of the hard synthetic resin and produced by the extrusion.

As shown in FIG. 4, the reception slits 11a as well as the reception holes 11b of all the support beams 11, and the reception holes 14a of the front and rear leg members 14 are provided with soft layers 11c and 14c made of a soft synthetic resin, respectively, while the support beams 11 and the leg members 14 are made of a hard synthetic resin. Thanking for the soft layers 11c and 14c provided on both the support beams 11 and the leg members 14, assembly, disassembly and reassembly of the elements 10, 11 and 14 are easily achieved due to the intrinsic elasticity of the soft layers 11c and 14c. In addition, the soft layers 11c and 14c prevent generation of creak during use of the chair, thus to achieve a desired performance of the chair.

In the same manner, the reception holes 13a and 17a of the back support columns 13 and of the back support beam 17 are provided with soft layers 13c and 17c made of the soft synthetic resin, while the back support columns 13 and the back support beam 17 are made of the hard synthetic resin. The soft layers 13c and 17c provided on both the back support columns 13 and the back support beam 17 cause assembly, disassembly and reassembly of the elements 13 and 17 to be easily achieved due to their intrinsic elasticity. These soft layers 13c and 17c also prevent generation of creak during use of the chair.

In assembly of the knockdown chair of this second alternate embodiment, the four longitudinal insert projections 10a of the square seat plate 10 integrally extending from the side surfaces of the seat plate 10 are inserted into individual reception slits 11a of the four support beams 11, thus to achieve engagement of the seat plate 10 with the support beams 11, Thereafter, the two inserts 12a of each of the first connection member 12 are tightly inserted in individual reception holes 11b of two corresponding support beams 11. The other insert 12a of the first connection member 12 is, thereafter, inserted into the reception hole 14a of a corresponding front leg member Thereafter, the two inserts 16a of each second connection member 16 are tightly inserted in individual reception holes 11b of two corresponding support beams 11. Another insert 16a of the second connection member 16 or the lower insert 16a is, thereafter, inserted into the reception hole 14a of a corresponding rear leg member 14. In addition, another insert 16a of the second connection member 16 or the upper insert 16a is inserted into the lower reception hole 13a of a corresponding back support column 13.

The two inserts 18a of each third connection member 18 are tightly inserted in a corresponding reception hole 17a of the back support beam 17 and in the upper reception hole 13a of a corresponding back support column 13, respectively, thus to accomplish the assembly of the knockdown chair of the second alternate embodiment.

In accordance with the knockdown chair according to the second alternate embodiment, the support beams 11, the back support columns 13, the front and rear leg members 14 and the back support beam 17 are made of a hard synthetic resin, while the reception slits and the reception holes of the elements 11, 13, 14 and 17 are provided with the soft layers made of the soft synthetic resin. Thanking for the soft layers provided in both the reception slits and the reception holes, assembly, disassembly and reassembly of the chair are easily achieved due to the intrinsic elasticity of the soft layers. In addition, the soft layers prevent generation of creak during use of the chair, thus to achieve the desired performance of the chair.

Figure 5:
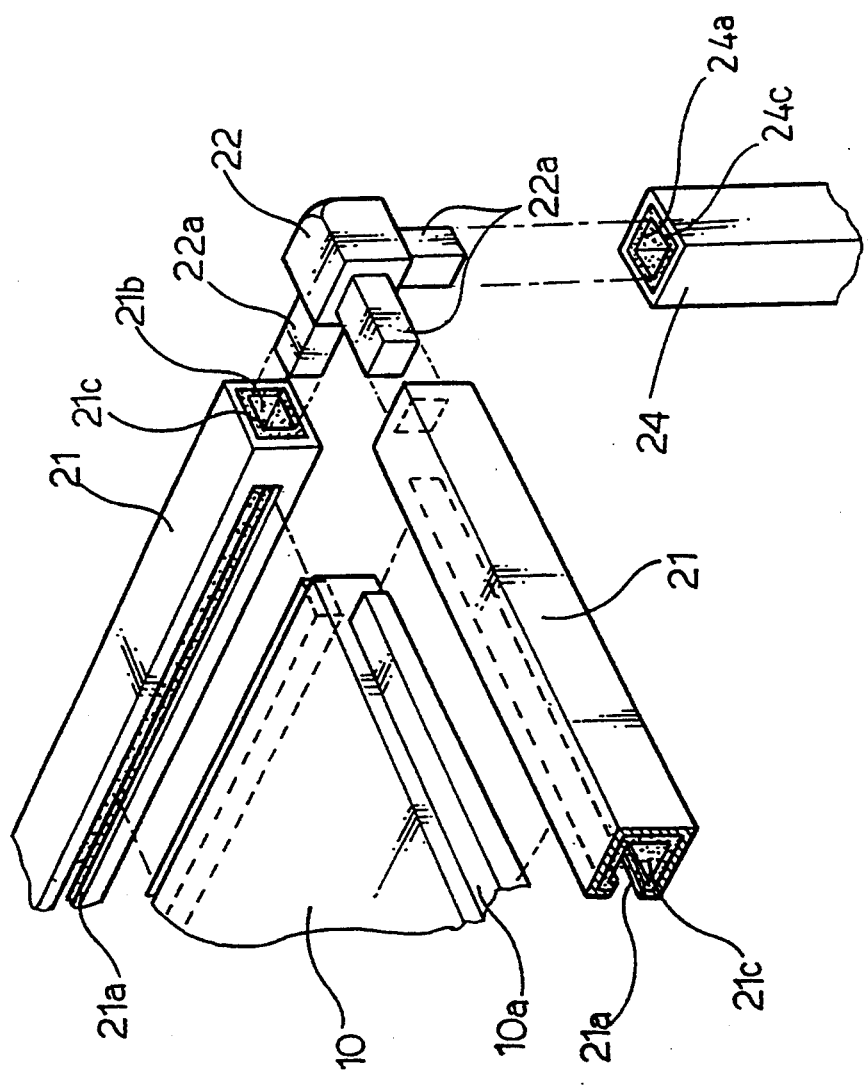
FIG. 5 is a partially enlarged exploded perspective view of a knockdown chair in accordance with a third alternate embodiment of the present invention, showing a connection structure of a seat plate, two support beams and a leg member using a connection member.
Figure 6:
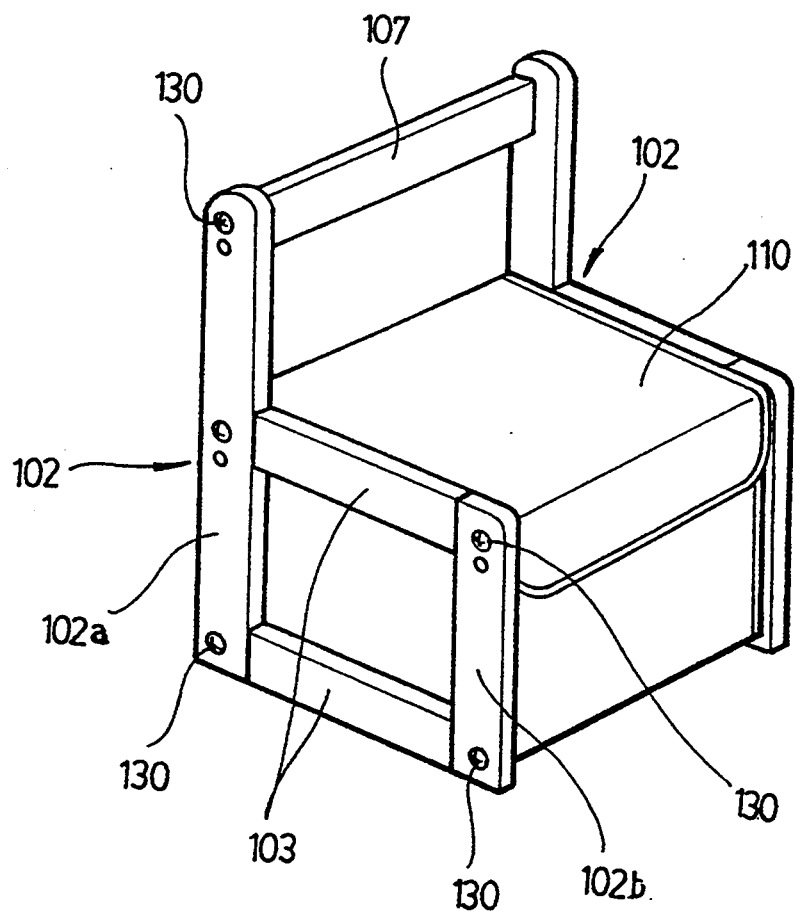
FIG. 6 is a perspective view of a knockdown chair for children in accordance with the prior art.

Turning to FIG. 5, there is shown a connection structure of a seat plate, support beams and a leg member using a connection member of a knockdown chair in accordance with a third alternate embodiment of the present invention. In this third alternate embodiment, the general shape of the chair remains the same as in the primary embodiment of FIG. 1, but the support beams 21 and the leg members 24 have rectangular cross sectioned shape and the support beams 21 are provided with soft layers 21c made of a soft synthetic resin on both their reception slits 21a and their reception holes 21b. Thanking for the soft layers 21c provided in both the reception slits and the reception holes, assembly, disassembly and reassembly of the chair are easily achieved due to the intrinsic elasticity of the soft layers 21c. In addition, the soft layers 21c prevent generation of creak during use of the chair, thus to achieve the desired performance of the chair.

In the same manner, the reception hole 24a of the leg member 24 is provided with a soft layer 24c made of a soft synthetic resin.

In order to correspond to the rectangular shapes of the reception holes 21b and 24a of both the support beams 21 and the leg members 24, the inserts 22a of the connection members 22 have rectangular sectioned shapes.

As described above, the knockdown chair according to the present invention easily achieves its assembly by insertion of linear insert projections of a seat plate into individual reception slits of support beams, by insertion of inserts of a connection member into reception holes of both corresponding support beams and a corresponding leg member. Therefore, the assembly and disassembly of the knockdown chair are easily achieved and the desired strength of the assembled chair is continued for a long time. In addition, the knockdown chair of this invention is preferably provided with soft layers at its support beams and its leg members so that assembly, disassembly and reassembly of the chair are achieved more easily due to the intrinsic elasticity of the soft layers. The soft layers also prevent generation of creak during use of the chair, thus to achieve the desired performance of the chair.

Having described specific preferred embodiments of the invention with reference to the accompanying drawings, it is to be understood that the invention is not limited to those precise embodiments, and that various changes and modifications may be effected there in by one skilled in the art without departing from the scope or spirit of the invention as defined in the appended claims.

What is claimed is:

1. A knockdown chair for children comprising:
   a polygonal seat plate having a projection on every side surface thereof;
   a plurality of support beams detachably engaging with and surrounding said seat plate by reception of individual projections of said seat plate each of said support beams having a reception slit for receiving the projection, and a pair of reception holes, said reception slit being provided at a side surface of said beam and said pair of reception holes being provided on opposed ends of said beam, respectively;
   a plurality of connection members detachably connecting said support beams to each other at corners of said seat plate, each of said connection members having coupling means extending outwardly therefrom in order to be detachably coupled not only to corresponding neighbor support beams but also to a leg member; and
   said leg member detachably coupled to said connection member for supporting said seat plate and said support beams,
   wherein said reception slit and said reception holes of said support beams are each provided with elastic soft layers made of a soft synthetic resin material for facilitating assembly and disassembly of said chair.

2. The knockdown chair according to claim 1, wherein said coupling means of each connection member comprises three plugs made of a soft synthetic resin material and integrally extending from said connection member such that they are perpendicular to each other, two of said three plugs being inserted in individual reception holes of said support beams and the other plug being inserted in said reception hole of said leg member.

3. A knockdown chair for children comprising:
   a polygonal seat plate having and outwardly extending flange projection on every side surface thereof;
   a plurality of support beams detachably engaging with and surrounding said seat plate by reception of individual outwardly extending flanges of said seat plate, each of said support beams having a reception slit for receiving one of said flanges, and a pair of reception holes, said reception slit being provided at a side surface of said beam and said pair of reception holes being provided on opposed ends of said beam, respectively;
   at least one first connection member detachably connecting corresponding neighbor support beams to each other at a front corner of said seat plate, said first connection member having coupling means in order to be detachably coupled to said support beams as well as to a front leg member;
   said front leg member detachably coupled at its upper end to a respective first connection member of said at least one first connection member in order to support said seat plate and said support beams, said front leg member having a reception hole at its upper end;
   at least one second connection member detachably connecting corresponding neighbor support beams to each other at a rear corner of said seat plate, said second connection member having coupling means in order to be detachably coupled to said support beams, to a corresponding back support column of a back support frame and to a rear leg member;
   said rear leg member detachably coupled at its upper end to a respective second connection member of said at least one second connection member in order to support, in cooperation with said front leg member, said seat plate and said support beams, said rear leg member having a reception hole at its upper end;
   at least one third connection member detachably connecting a corresponding back support column to a back beam, said third connection member having coupling means in order to be coupled to both said back support column and said back beam; and
   said back support column and said back beam detachably coupled to each other by said at least one third connection member in order to form said back support frame, each of said back support column and said back beam having a pair of reception holes at its opposed ends,
   wherein said reception slit and said reception holes of said support beams are provided with elastic soft layers made of a soft synthetic resin material, respectively, for facilitating assembly and disassembly of said chair.

4. The knockdown chair according to claim 3, wherein said coupling means of said first connection member comprises three plugs made of a soft synthetic resin material and integrally extending from said first connection member such that they are perpendicular to each other, two of said three plugs being inserted in individual reception holes of said support beams and the other plug being inserted in said reception hole of said front leg member.

5. The knockdown chair according to claim 3, wherein said coupling means of said second connection member comprises four plugs made of a soft synthetic resin material and integrally extending from said second connection member such that they are perpendicular to each other, two of said four plugs being inserted into individual reception holes of said support beams and the other plugs being inserted into a lower reception hole of said back support column and into said reception hole of said rear leg member, respectively.

6. The knockdown chair according to claim 3, wherein said coupling means of said third connection member comprises two plugs made of a soft synthetic resin material and integrally extending from said third connection member such that they are perpendicular to each other, said two plugs being inserted into an upper reception hole of said back support column and into said reception hole of said back beam, respectively.

7. The knockdown chair according to claim 3, wherein said reception hole of each of said front and rear leg members is provided with an elastic soft layer made of a soft synthetic resin material for facilitating assembly and disassembly of said chair.

8. The knockdown chair according to claim 3, wherein said reception hole of said back support beam is provided with an elastic soft layer made of a soft synthetic resin material for facilitating assembly and disassembly of said chair.

* * * * *